United States Patent

[11] 3,584,135

| [72] | Inventor | Lindy Dowtin<br>Washington, D.C. |
|---|---|---|
| [21] | Appl. No. | 853,145 |
| [22] | Filed | Aug. 26, 1969 |
| [45] | Patented | June 8, 1971 |
| [73] | Assignee | The United States of America as represented by the Secretary of the Navy |

[54] PORTABLE INSTRUMENT CASE
5 Claims, 2 Drawing Figs.

[52] U.S. Cl. .................................................. 174/50,
220/20, 220/24
[51] Int. Cl. ...................................................... H05k 5/03,
B65d 51/26
[50] Field of Search ............................................ 174/50, 52
R; 220/20, 24 R

[56]  References Cited
UNITED STATES PATENTS

| 2,825,483 | 3/1958 | Maron | 220/24X |
| 3,184,645 | 5/1965 | Schaeffer | 174/52X |
| 3,316,452 | 4/1967 | Barlow | 174/52X |
| 3,476,867 | 11/1969 | Mack | 174/52X |

*Primary Examiner*—George E. Lowrance
*Attorneys*—R. S. Sciascia and J. A. Cooke ABSTRACT: A case for a battery-powered instrument having a lower instrument-containing section, an upper battery-containing section with inwardly extending flanges at the top, and a cover. The flanges at the top are notched to receive the batteries, and the underside of the edge of the cover has blocks secured thereto aligned with the notches to hold down the batteries against shifting in the case.

PATENTED JUN 8 1971 3,584,135

INVENTOR
Lindy Dowtin

BY
J. O. Tresansky
ATTORNEY

PORTABLE INSTRUMENT CASE

BACKGROUND OF THE INVENTION

This invention generally relates to instrument housings and, more particularly, to cases for battery-powered portable instruments designed to withstand severe conditions.

Portable battery-powered instruments designed for rough handling and rigorous conditions such as marine and airborne equipment, are housed in cases that must be both strong enough to protect and support the instrument and also facilitate ready access to the batteries and the instrument. While cases of sufficient strength are available, it is difficult to find one that permits ready access to the battery compartment and is also economical to produce.

Most prior art cases provide for easy access to the instrument, but little effort has been exerted in designing economical, heavy-duty cases affording ready access to the battery compartment. For economy of manufacture as well as for optimum structural support an protection of the batteries and instruments, it is desirable that the housing sidewalls provide "wrap around" support and be of unified construction to thereby obviate a heavy cover with many bolts to secure it to the case. When the batteries have been expended, it is necessary to remove them and replace them with fresh batteries. This necessitates removal of the cover and the battery compartment housing, positioning of the fresh batteries in the battery compartment, replacement of the housing, attachment of the battery cable, and then finally replacement of the cover. This has been a source of much inconvenience and irritation to the users of the instrument. Therefore, a need has long existed for a battery housing affording "wrap around" support of unified construction, but which permitted ready insertion and removal of the batteries from the housing.

SUMMARY OF THE INVENTION

Accordingly, one object of this invention is to provide a portable instrument case which permits easy access to the battery compartment.

Another object of the present invention is the provision of a portable instrument case which permits easy insertion and removal of the batteries and also firmly supports the batteries against shifting within the case.

Still another object of this invention is to provide a housing for a battery-powered instrument which is of rugged and durable construction, yet is relatively economical to manufacture.

Briefly, in accordance with one embodiment of this invention, these and other objects are attained by providing a case having an instrument and a battery compartment. The battery compartment is inwardly flanged at its upper end and provided with a cover. The flange is notched to permit insertion of the batteries into the housing without necessitating the removal of the housing, and the underside of the cover has secured around the edge thereof a number of blocks aligned with the notches in the housing flange. With the cover in place, the blocks bear against the top of the batteries to hold them against shifting during handling of the case.

DESCRIPTION OF A PREFERRED EMBODIMENT

Figure 1:
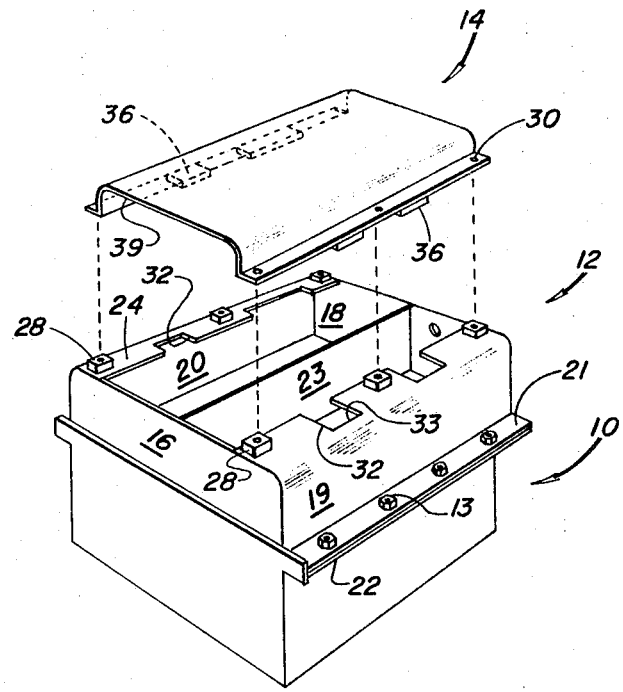
Figure 2:
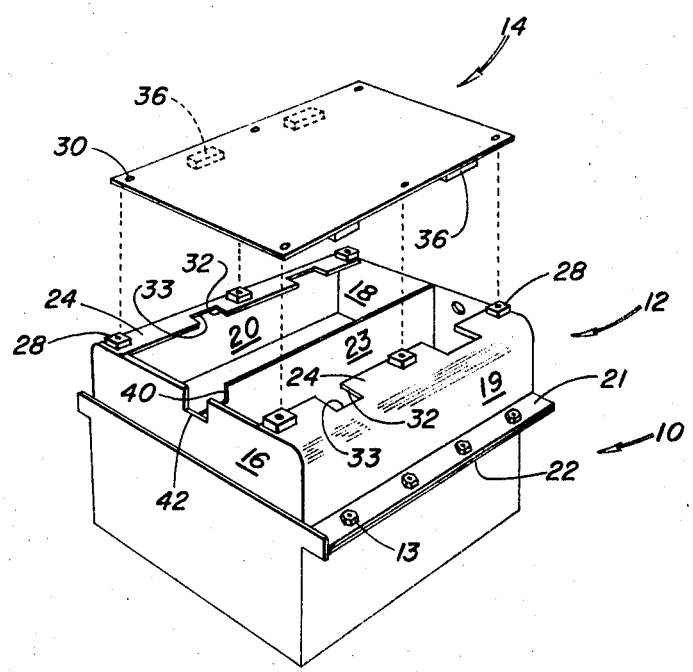

A more complete appreciation of the invention and its many attendant advantages will develop as the same becomes better understood by reference to the following detailed description when considered in connection with the accompanying drawings wherein:

FIG. 1 is a perspective view of a preferred embodiment of the invention with the cover raised to show the top of the case; and FIG. 2 is a similar perspective view of an alternative embodiment of the invention.

Referring now to the drawings wherein like reference characters designated identical or corresponding parts throughout the several views and more particularly to FIG. 1 thereof, a portable instrument case is shown having a lower rectangular instrument housing 10, which may be of watertight construction and an upper battery compartment housing 12 of similar external configuration secured to instrument housing 10. The open top of battery compartment housing 12 closed by a cover plate 14. The battery compartment housing 12 has spaced parallel sidewalls 16 and 18, and extending between and connected to the ends thereof are spaced parallel walls 19 and 20. Parallel to walls 19 and 20 is a partition 23 connected at its ends to sidewalls 16 and 18 which divides the compartment into two substantially equal-sized portions.

The lower edges of walls 19 and 20 have outwardly extending horizontal flanges 21 which correspond to a similar pair of horizontal flanges 22 on the top edges of the instrument housing walls. A plurality of bolts 13 pass through a number of aligned apertures formed in flanges 21 and 22 to firmly secure housings 10 and 12.

Walls 19 and 20 have extending perpendicularly inwardly from the tops thereof projecting flanges 24. Secured to the top of flanges 24 are a plurality of threaded blocks, such as machine nuts 28. The outside edges of cover 14 have formed therethrough a plurality of apertures 30 positioned to align with the threaded holes in nuts 28 thereby enabling cover 14 to be secured to battery housing 12 by conventional bolts or machine screws, not shown. A plurality of notches 32 are formed in flanges 24 having a width corresponding to the width of the battery to be inserted therein and deep enough so that the distance between the inside edges 33 of notches 32 and the partition 23 corresponds to the width of the battery to be inserted therein. Cover 14 has secured to the underside of the front and rear edge thereof a set of blocks 36 aligned with notches 32.

In use, when batteries are desired to be installed or replaced, the bolts extending through apertures 30 and threaded into nuts 28 are removed and cover 14 is lifted off, thereby exposing the battery compartment. A battery cable (not shown) is removed and the expended batteries are simply lifted out and discarded. Fresh batteries are then inserted into battery compartment housing 12 through notches 32 and 34 and the battery cable is replaced. The cover 14 is then replaced on top of battery compartment housing 12 with holes 30 and nuts 28 in alignment. In this position, blocks 36 bear against the top surface of the batteries and when the cover 14 is tightly screwed down, blocks 36 press firmly against the top of the batteries and in concert with the action of notches 32 and 34 securely hold them in place against shifting. Instead of using individual batteries as wide as notches 32, it is contemplated that larger batteries having a key the same width as notches 32, or even a single battery block having several keys arranged to align with notches 32 may be used.

The cover 14 shown in FIG. 1 is centrally arched to permit the extension of an electrical cable from inside the battery compartment to the related equipment (not shown). For equipment that is designed for operation in the water, such as radio buoys, scientific instruments for monitoring of the ocean bottom, or mines, and in which water activated batteries are used, all instrumentation in the battery compartment may be moved to the instrument compartment and water may be permitted ingress through the arched cover.

The embodiment of FIG. 2 differs from that of FIG. 1 in that the cover 14 is a flat plate and partition 23 and sidewall 16 are provided with notches 40 and 42, respectively, to permit the extension of the battery and instrument cable, not shown, from the instrument case to the related equipment, thereby reducing the profile of the case.

Obviously, numerous variations and modifications of the above described best mode or preferred embodiment of the invention, defined by the appended claims, may be made.

What I claim as new and desire to be secured by Letters Patent of the United States is:

1. A portable instrument case comprising:
   an instrument compartment housing;
   a battery compartment housing rigidly connected to said instrument compartment housing and having a plurality of upstanding sidewalls; a flange extending from the top of at least one of said sidewalls over said compartment; said flange having means defining at least one notch in the inner edge thereof;

a cover having a top side and an underside;

at least one block secured to the underside of said cover at the edge thereof and aligned with said notch;

whereby when said cover is in position over said compartment, said block will be aligned with said notch to hold a battery in said compartment securely in position against lateral shifting.

2. The case defined in claim 1 wherein:

at least two of said upstanding sidewalls are spaced apart and parallel, both having formed on the top thereof a respective one of said inwardly extending flanges; and a partition extending between and parallel to said parallel sidewalls.

3. The case defined in claim 2 wherein:

said cover is arched upwardly at the middle portion, leaving thereby an arch-shaped space between said cover and the top of said sidewall.

4. The case defined in claim 1 wherein:

said cover is flat;

said partition has means therein defining a notch adjacent one of said sidewalls; and said one of said sidewalls has means therein defining a notch adjacent said partition notch, forming thereby a passage from the exterior of said case into said battery compartment on both sides of said partition.

5. A portable instrument case comprising:

an instrument compartment housing having upstanding walls outwardly flanged at the upper edges thereof;

a battery compartment housing having an open top and sidewalls outwardly flanged at the lower edges thereof and inwardly flanged at the upper edges thereof;

said outward flanges of said instrument compartment housing and said battery compartment housing respectively being secured together to thereby secure said housings together;

said inward flanges of said battery compartment housing sidewalls having formed therein a plurality of notches;

a cover removably secured to said open top of said battery compartment housing and having a plurality of blocks secured to the underside thereof aligned with said notches;

whereby batteries may be inserted through said notches in said flanges into said battery compartment and said cover secured to the top of said battery compartment housing so that said blocks aligned with said notches bear firmly against the batteries and hold them firmly against shifting.